Sept. 14, 1948.　　　　　J. R. HOLICER　　　　　2,449,119
CONTROL FITTING FOR LIQUEFIED PETROLEUM GAS TANKS
Filed Oct. 14, 1944　　　　　　　　　　　　5 Sheets-Sheet 1
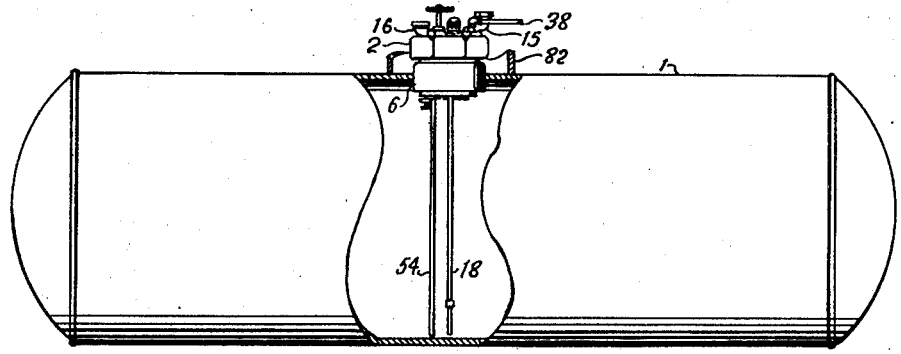
Fig. I
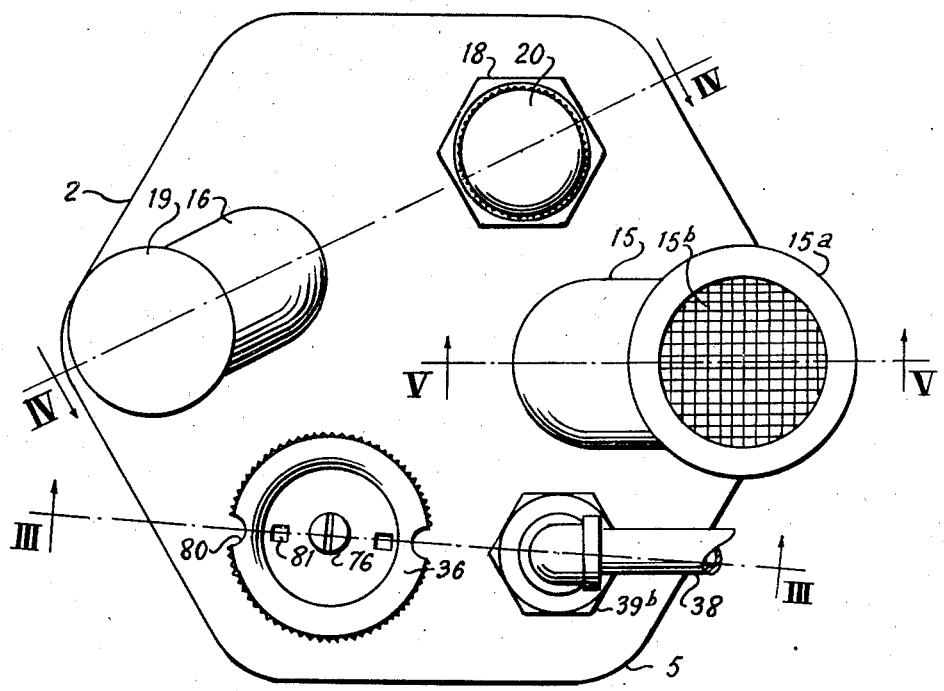
Fig. II
John R. Holicer
INVENTOR.
BY　*S. Austin Weir*
ATTORNEY

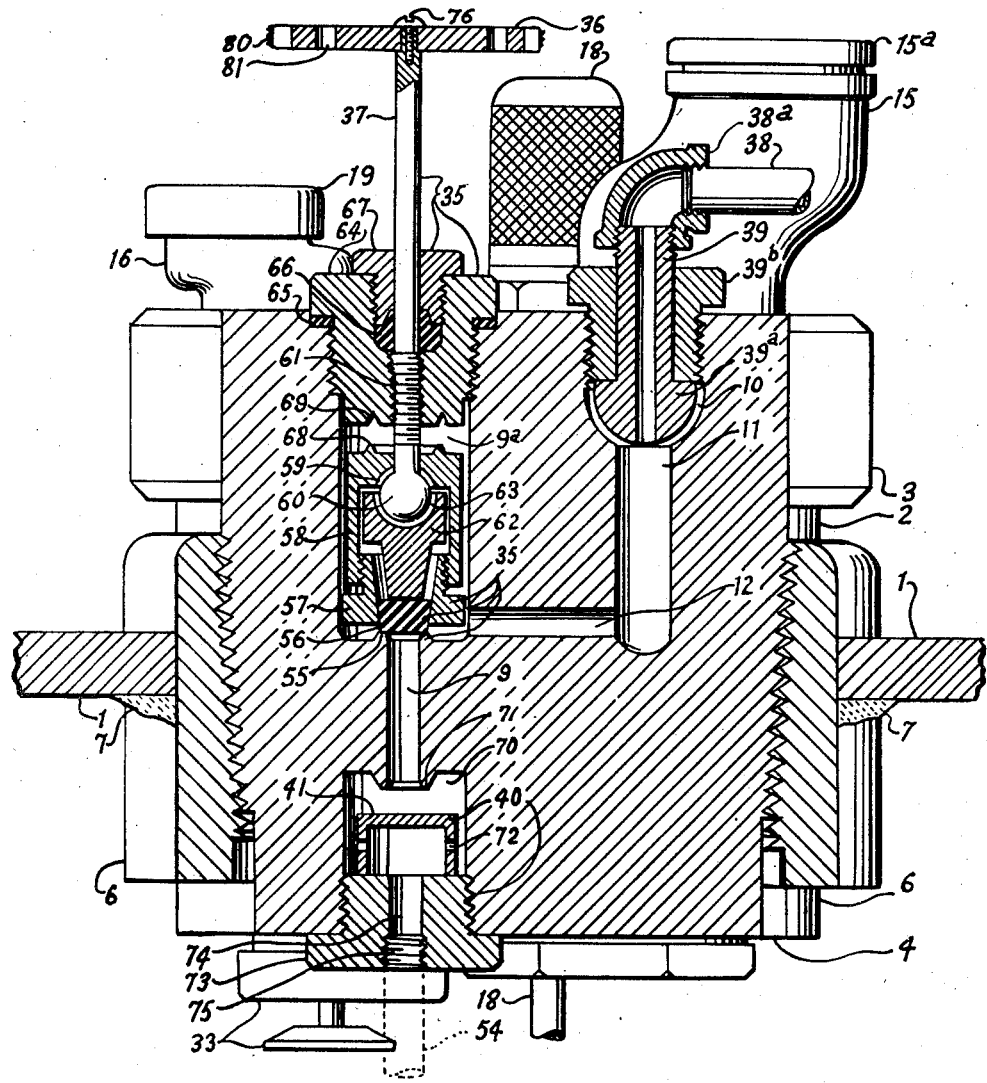
Fig. III

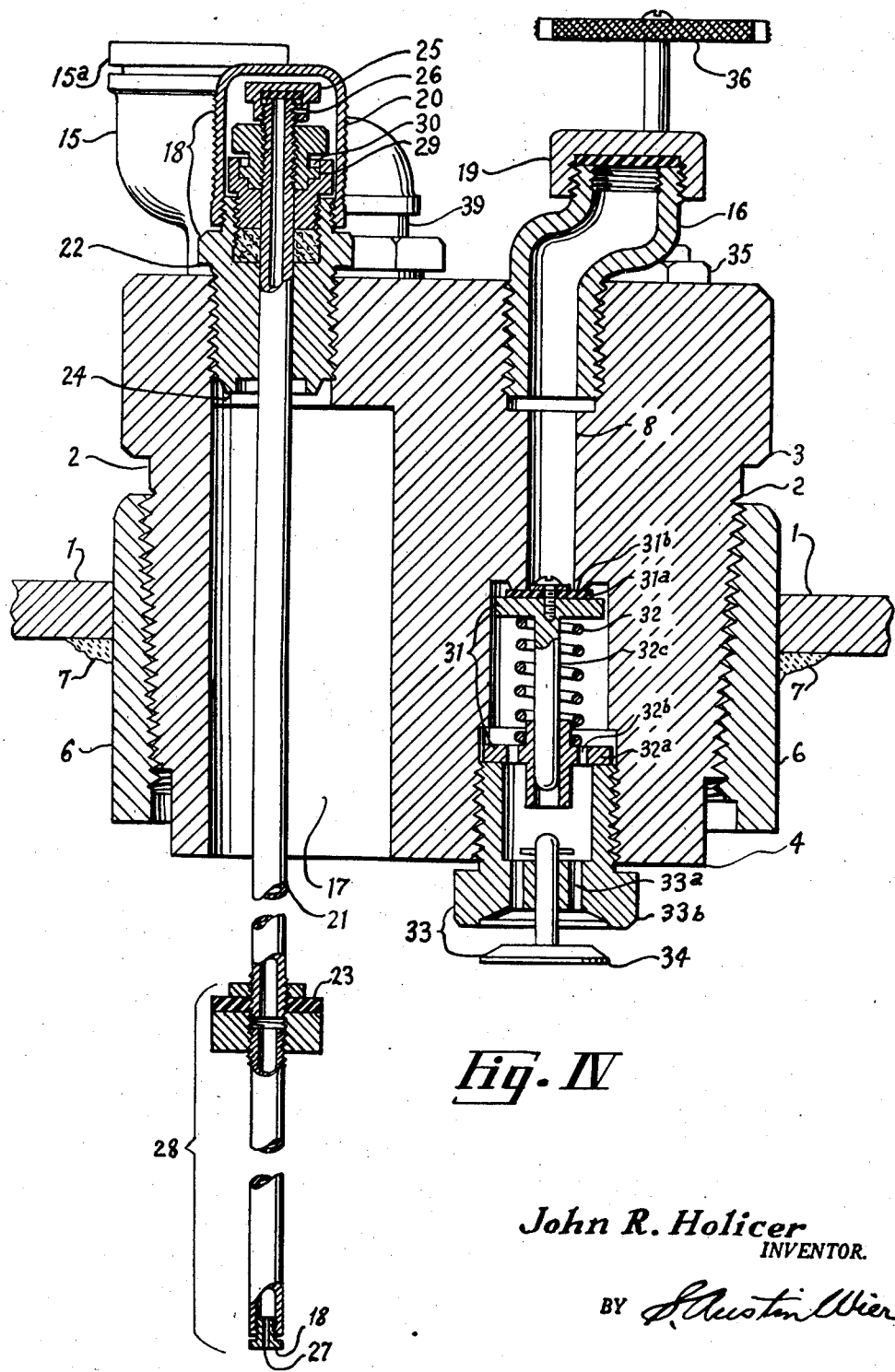
Fig. IV
John R. Holicer
INVENTOR.
BY [signature]
ATTORNEY

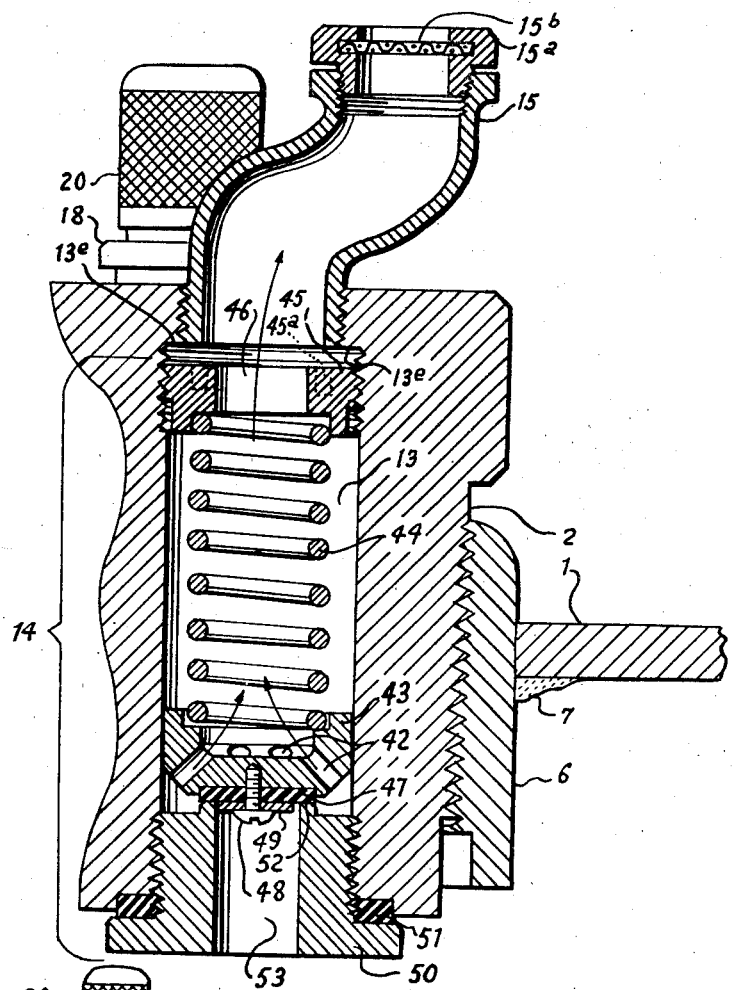
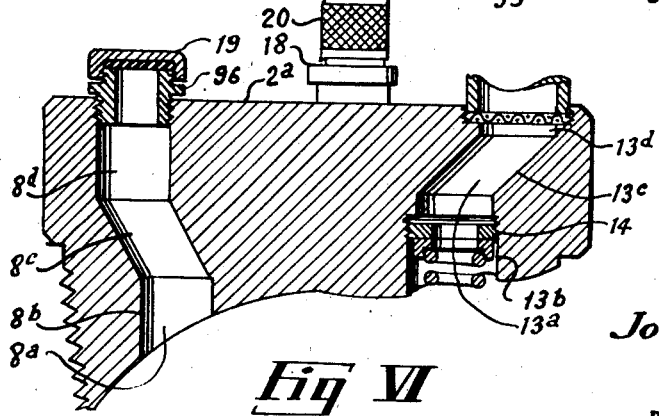
Fig. V
Fig VI
John R. Holicer, INVENTOR.

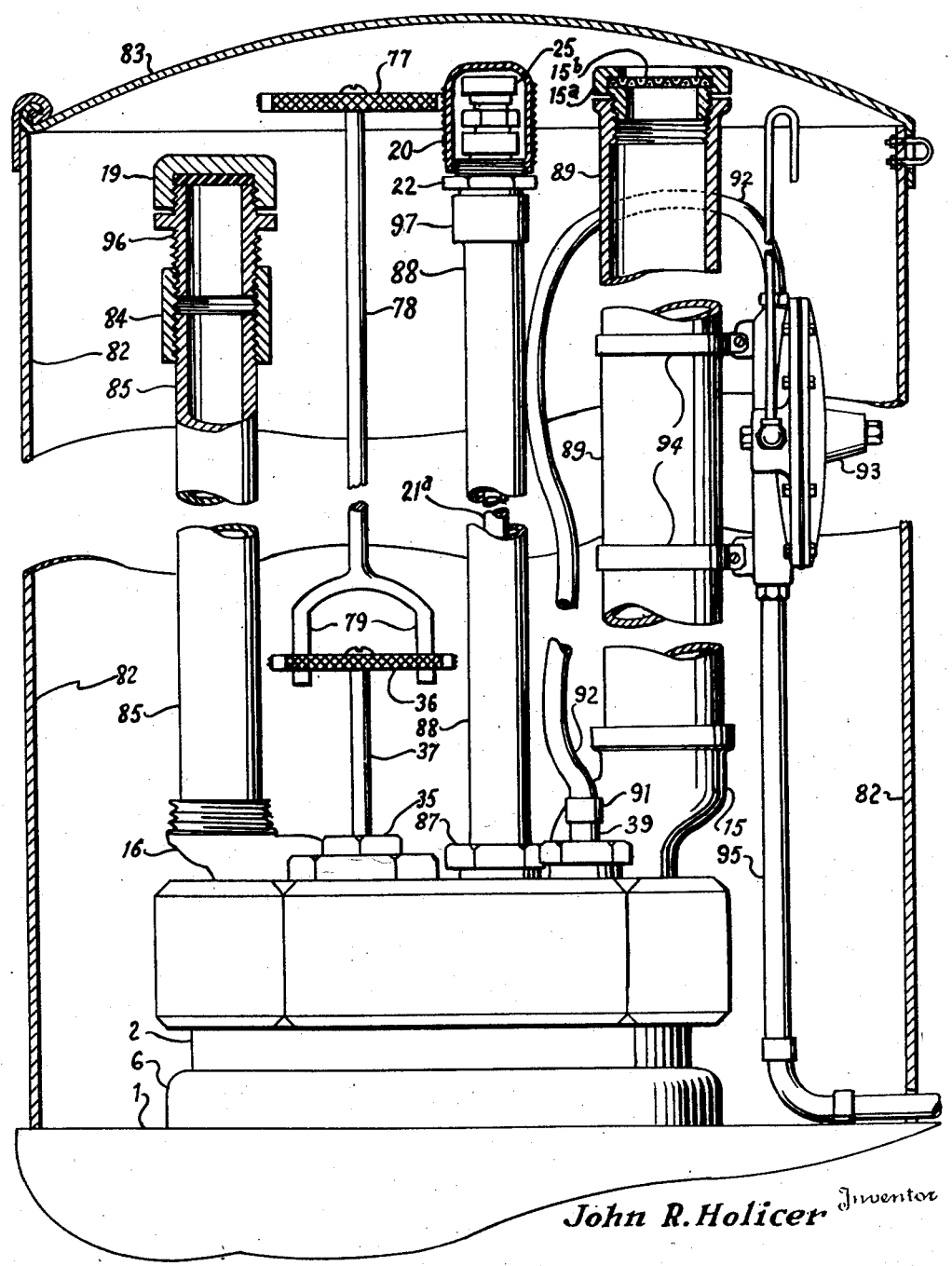
Fig. VII

Patented Sept. 14, 1948

2,449,119

UNITED STATES PATENT OFFICE 2,449,119

CONTROL FITTING FOR LIQUEFIED PETROLEUM GAS TANKS

John R. Holicer, Shreveport, La.

Application October 14, 1944, Serial No. 558,775

5 Claims. (Cl. 62—1)

1

This invention has to do with apparatus and mechanism for controlling and handling liquefied petroleum gas, such as butane and similar fuels.

It consists primarily of a single, compact, removable fitting, carrying built-in valves and control mechanism. It constitutes an improvement over the invention disclosed in my co-pending application for patent filed on September 2, 1943, under Serial No. 501,019. This invention has most of the advantages found in the device shown in that application and in addition presents certain very definite improvements and advantages thereover.

This fitting is carried in the shell of a tank containing liquefied petroleum gas under pressure, and it is used to control the introduction, the storage, the delivery and the examination of fuel in the tank and the relief of excess pressure therein. One single fitting furnishes mechanism for all these controls.

The use of this single fitting eliminates certain paraphernalia formerly used in old installations, including a dome, standpipe or other extension of the tank itself.

It provides features of maximum safety in the handling of the unstable, inflammable and explosive liquefied petroleum gas; and like my earlier invention referred to this fitting cannot be broken off from the tank in the course of unusual use, or even when the tank carrying this fitting is subjected to violent and unusual stress, as may occur when the fitted tank is rolled over or accidentally dropped in the course of handling or installation.

The valves within the fitting are unusually well protected, being encased by the body of the fitting itself; and very few parts extend above the top of this fitting, and even these are very difficult to break off; and if broken off the contents of the tank are not expelled to the atmosphere. Thus safety is promoted.

Among the objects of this invention are the following:

(a) The provision of a single, compact and practically indestructible fitting for carrying, housing and protecting valves necessary in the control of volatile fuel.

(b) The furnishing of a single control fitting without any breakable projections therefrom, either above or below.

(c) The creation of a control fitting of extremely small compass, light in weight and requiring relatively little material, thus to save costs of both material and labor and to minimize shipping charges.

(d) Providing a control fitting of extremely narrow diameter but of so novel a design as to allow room for all necessary valves, and at the same time allow connections to be made up on

2 the top of the fitting in such manner that no one make-up interferes with the others.

(e) Provision of offset features in passageways through the fitting which will accommodate all the necessary valves and connections yet greatly reduce the quantity of material in the fitting and the time and cost of making it.

(f) The provision of a fitting of such small diameter in its lower end as to greatly reduce the size of the hole made in the tank to receive it, thus at once strengthening the fitting itself and preventing the weakening of the tank wall.

(g) The provision of a compact control fitting usable as well on buried storage tanks as for those above ground, and adapted to the addition of extension pipes above the fitting where it is used underground.

(h) The provision of a compact control fitting having a built-in relief valve in which the valve spring does not interfere with the fluid discharge through the valve and in which the ports receiving this fluid into the valve are arranged at such an angle as to expedite the discharge and not inhibit or lessen its velocity or volume, and in which fitting the relief valve may be adjusted through an opening in the top of the fitting but may not be removed through such opening.

(i) The provision of a compact control fitting having built therein a fuel delivery shutoff valve so constructed that the valve is entirely sealed against leakage when fully opened as well as when closed, and the fitting being provided with an offset connection for the fuel delivery pipe that makes unnecessary any direct connection between this pipe and the valve itself, the easier to install, inspect and repair this valve, without in any way causing leaks in the fuel delivery line.

With these objects in view, preferred forms of this device are disclosed in the accompanying drawings and further set out in this specification.

It may be readily seen, however, that adaptations and changes from the exact construction of these disclosures may be made without in any manner departing from the spirit and objects of this invention.

In the drawings:

Fig. I is a diagrammatic and partially sectionalized view of a liquefied petroleum gas tank having an offset control fitting mounted therein Fig. II is a plan view of the control fitting, as seen from above.

Fig. III is a sectionalized elevation of the fitting taken along lines III—III of Fig. II.

Fig. IV is a sectionalized elevation of the fitting taken along lines IV—IV of Fig. II.

Fig. V is a sectionalized elevation of a part of the fitting taken along lines V—V of Fig. II.

Fig. VI is a sectionalized view of a part of a modified form of the fitting showing offset passageways built into the fitting.

Fig. VII shows extension members above the fitting when it is used on underground tanks.

In making detailed references to the parts of this device shown in the drawings, they are indicated by reference numerals; and the numeral 1 indicates a liquefied petroleum gas storage tank in which is mounted the control fitting 2. This fitting has a single body, the upper part 3 of which is wider than the lower part 4. It may be threaded into the relatively small opening in the tank by the use of a collar 6 set into the wall of the tank and there affixed by welding 7; or the fitting may be removably attached to the tank by any other suitable means, such as a flange. The fitting may have shoulders 5 if desired.

The fitting is provided with several passageways therethrough; and of these, passageway 8 is the filling passageway, through which the tank may be supplied with liquid fuel; and passageway 9 is provided for the delivery of fuel from the tank (either in liquid or gaseous form). Communicating with the fuel delivery passageway is adapter recess 10 ending in channel 11, while cross channel 12 affords communication between the passageway 9 and the channel 11 below the recess.

Passageway 13 is provided to have built therein relief valve 14; and this passageway communicates with an offset discharge connection 15. The filling passageway 8 also communicates in its upper end with an offset filling connection 16. Thus it will be seen that passageways 8, 9 and 13 have offset openings communicating with their upper ends.

This arrangement is made so that more space may be allowed on the top of the fitting 2 for making conduit connections to these openings. This is a feature of considerable importance in that in making up threaded connections, such as may be used here, sufficient room must be had to turn and thread and make up these connections; and room must be provided for tools and wrenches used in the turning and in the make-up.

Ordinarily, if the spacing for these connections were allowed to control the size of the fitting 2 it would be made unnecessarily large, bulky and unwieldy, as well as expensive and heavy.

It is to be noted that through the use of these offset arrangements fitting 2 is unusually compact and small; and the passageways communicating with the tank from the lower end of the fitting are relatively close together, allowing the entire fitting to be small, and especially allowing its lower end to be smaller than would otherwise be necessary.

The fourth passageway 17 is provided through the fitting for mounting and carrying a gage 18. In the illustration used the gage is a slip tube gage, substantially such as is disclosed in my co-pending application filed September 2, 1943, under Serial No. 501,022. When this type of gage is used it is necessary that passageway 17 be substantially vertical in disposition through the fitting 2; but this is the only passageway in this fitting that is required to be so disposed and which is not provided with an offset opening on the top of the fitting.

Nevertheless, the fact that the other passageways are offset, so that the connections to their upper ends may be made very near to the periphery of the upper part of the fitting 2 allows room for the gage 18 to be placed in the fitting and made up and removed through the use of suitable tools without in any way interfering with the connections to be made to the offset passageways, and without in any way having such connections interfere with the placing and removal of the gage or in the making of any other connections.

In delineating the offset features of the passageways referred to above, illustration has been made of offset connections 15 and 16, which may be screwed into place in the top of the fitting to effect the desired offsets.

Connection 15 carries threaded ring 15a having therein a transversally arranged screen 15b, to keep out foreign materials.

However, the offset of passageway 9 (fuel delivery passageway) is effected by having the recess 10 and its cross channel connection 12 built into the fitting itself. This results in compactness and promotes safety.

Likewise, in a modified form of the fitting the offset passageway 13a can be built into the fitting by the use of a substantially vertical conduit 13b in the lower part of fitting 2a, and a substantially vertical conduit 13d in the upper part of the fitting, both connected together by cross channel 13c, thus to form an offset discharge passageway entirely built-in and made integral with the fitting 2a.

In the same way filling passageway 8a can be built into the fitting 2a in integral fashion, through use of the substantially vertically disposed conduits 8b and 8d which are arranged to communicate through the cross channel 8c. The building of these offset channels within the body of the fitting itself is illustrated in Fig. VI.

Shutoff valve 35 is of simplified design, and is built into an enlargement 9a of passageway 9; and at the bottom of the enlargement, valve seat 55 is provided. Cooperating with this seat is gasket 56 carried in valve head 57. This head is screwed into the lower end of sleeve 58; and the upper part of the sleeve is provided with a concave shoulder 59 for articulation with a spherical enlargement 60 on the lower end of valve stem 37. The stem has elevating threads 61.

Carried within the sleeve is valve plug 62 by which pressure may be applied to gasket 56; and in the upper end of this plug is a spherical concavity 63 designed to articulate with the member 60. Valve collar 64 keeps the valve in place in the enlarged passageway which is sealed by the use of gasket ring 65. This collar has internal threads to cooperate with elevating threads 61 on the valve stem. Packing 66 is arranged around the valve stem where it is kept tightly in place by compression plug 67. The upper face of sleeve 58 is finished with an alignment seat 68 which articulates the recess 69 in the lower face of member 64, to prevent leakage when the valve is open.

The passageway 9 is again enlarged into a tubular channel 70 at its lower end to receive and house the inverted thimble 41. The upper part of channel 70, where the enlargement begins, is finished to form a circular valve seat 71 with which the upper face of thimble 41 articulates to effect a valve, which may be opened and closed. In ordinary operation valve 35 remains entirely open, and fuel (in liquid or gaseous state) ascends through channels 70, 9, 12 and 11 to be discharged out of member 39 and into delivery pipe 38. During this operation a sufficient quantity of such fuel normally flows upwardly through apertures 72 which are sufficient in size to accommodate this normal flow. However, if pipe 38 is broken, or the discharge pressure therein is otherwise relieved, there is attempted a greater flow of fuel through channel 70 by reason of the pressure within tank 1. This greater flow results in the lifting upwardly of thimble 41, so that its upper face comes to rest against the seat 71 to close the excess flow check valve and prevent the further escape of fuel.

No gasket is used on seat 71 or on the upper face of thimble 41 as it is not desired that this excess flow check valve stick or remain firmly closed after pipe 38 has been repaired and pressure equalized therein. When this is done the weight of thimble 41 causes the thimble to drop down again to its normal resting place on the top of plug 73. This plug, screwed into channel 70, is a part of valve 40, supporting and maintaining the valve in the channel. This plug 73 has an orifice 74 therethrough to permit the passage of fluid fuel; and the lower part of this orifice is provided with threads 75 to receive the end of threaded pipe 54 (which is used whenever it is desired to pick up liquid fuel instead of gaseous fuel). When pipe 54 is used it extends almost to the bottom of tank 1.

While any form of suitable operating mechanism may be used to rotate valve stem 37, the handwheel 36 is indicated; and this wheel may be kept in place through the use of screw 76.

The tubular adapter 39 is made with a hemispherical enlargement 39a at its lower end to conform to the concave surface of the bottom of recess 10; and it is kept tightly fitted therein through the use of compression nut 39b. The upper end of tubular adapter 39 is threaded for connection to gas delivery pipe 38 through the use of elbow 38a. If it be desired that pipe 38 extend upwardly instead of laterally a simple pipe coupling may be substituted for the elbow 38a.

This control fitting may be used on liquefied petroleum gas tanks erected above ground, for which it is admirably adapted. It may also be used on storage tanks buried in the ground. When so used no changes whatsoever need be made in the fitting itself; but modifications are indicated for the installation.

A hood 82, having a hinged cover 83, may be rested on top of the tank so as to completely surround the fitting; and this hood is extended up through the earth to the desired height above the level of the ground to keep dirt and foreign material from covering the control fitting. This type of installation requires certain extension members for outlets on the top of the fitting.

The offset filling connection 16 is arranged to carry a vertical pipe 85 which ends in pipe collar 84. This collar may have a hose coupling 96 attached so that fuel may be delivered into the tank below ground from a delivery truck standing above ground.

While the filling of an underground tank is being done the gage must be read and, so that this may be done conveniently, the gage housing 22 is first removed from passageway 17, a longer tube 21a is substituted for ordinary tube 21, and special bushing 87, having a valve seat on its lower end made like valve seat 24, is screwed into the fitting, in place of member 22, to receive extension pipe 88. This pipe is threaded on its upper end (at about ground level) to carry collar 97 which receives the gage assembly removed from passageway 17. Thus the gage is extended.

The relief valve will discharge excess pressure into the ventilated hood through offset connection 15 very satisfactorily; but in order to prevent any water or foreign accumulations in connection 15 when the control fitting is used on underground tanks, it is desirable to screw into the top of connection 15 the relief discharge pipe 89 which is then fitted at its top with a screen to prevent insects and trash from getting into the discharge pipe or the relief valve itself.

To operate the shutoff valve 35 a wrench 77 is provided, including extension rod 78 which has wrench fingers 79 on its lower end. These fingers may be made to engage notches 80 in the handwheel 36 or holes 81 provided through the wheel. This wrench enables an operator to open and close valve 35 from the ground level.

To conduct fuel away from the buried tank, pipe coupling 91 is substituted for conventional elbow 38a; and there is threaded into this coupling a short pipe or flexible tubing 92 which passes into a conventional pressure regulator 93. The regulator (for reducing fuel pressure) may be attached to the side wall of the hood 82 or supported by relief pipe 89 to which it may be attached with straps 94. From the pressure regulator fuel delivery pipe 95 may be caused to pass out of the hood for delivering fuel for use.

Thus it will be seen that with slight modifications in the method of installation, and through the use of appropriate extension members (indicated in Fig. VII) my standard offset control fitting may be used very conveniently and satisfactorily on underground storage tanks containing liquefied petroleum gas.

The offset control fitting may be completely made and finished at the factory, and there fully tested; and the relief valve 14 may be there set to relieve at whatever pounds pressure is desirable. Then this single fitting, which is to be used for the complete control of liquefied petroleum gas in storage, may be shipped from the factory fully ready for use by the tank maker or assembling shop.

This fitting is simply fixed into a small opening in the tank properly formed to receive it, and then made up tight and leak-proof. No arrangement or adjustment or tinkering with the valves, passageways and conduits in the fitting is required or necessary at the assembling plant.

Thus this fitting is safe, sure and certain in operation; and it may be fitted quite properly into the fuel tank by very inexperienced and untrained workers, with full assurance that it will function properly when the entire tank assembly is delivered to the user.

In the operation and use of this offset control fitting the cap 19 is removed from the opening leading to the filling passageway 8, and a connection is made with the delivery truck bringing new fuel; and this fuel is forced into the storage tank 1, either by gravity or under pressure or both.

During the filling process gage 18 is uncapped by the removal of gage cap 20; and gage tube 21 is allowed to slide upwardly through its housing 22 until the valve formed of the co-acting parts 23 and 24 closes around the outside of the tube to prevent the unwanted escape of fuel around the tube. The inspection cap 25, at the top of the tube, is partially removed until port 26 is elevated and opened to communicate with tube 21 and with the atmosphere. With the gage in this open position gas will enter orifice 27, at the bottom of the tube, and be discharged in very small quantity from port 26, where it can be seen. As long as gas is thus being discharged the operator continues to fill the storage tank.

Whenever liquid fuel appears and is discharged from port 26, no further fuel is put into the storage tank.

Furthermore, the operator knows that the right quantity of fuel has been introduced, and no more; because the lower end of the slip tube gage, which is disposed below the valve formed of elements 23 and 24, constitutes in its extent a measure of "outage space" 28. This space is that required to be left above the level of the liquid fuel in the storage tank for safety purposes and for the accumulation of gas. The slip tube gage is constructed and operated in the manner indicated so as to prevent the overfilling of the storage tank and so as to always allow sufficient "outage space" as a cushion for the further expansion of gas in the event the storage tank becomes later heated to a higher temperature than obtains at the time of filling.

When the filling operation is complete the slip tube gage is re-introduced into the tank, locked in place by turning the dogs 29 into the slot 30, which is provided with an overhanging lip to hold the dogs in place; and the gage cap 20 is screwed into place above the gage to further absolutely close and seal it and prevent the escape of any gas whatsoever.

During the time the filling operation is underway the liquid fuel falls into the enlarged lower part of passageway 8; and the weight and pressure of this fuel on the valve disc opens filling valve 31 by overcoming the resistance of its closing spring 32, so that the liquid fuel flows freely into the tank. Member 32a is a spring holding member which is carried on rod 32c so that the spring 32 may be supported and retained and at the same time adjusted in tension. Member 32a is provided with ports 32b therethrough for the passage of liquid fuel into the tank. Valve 31 has a gasket 31a which co-acts with valve seat 31b formed at the upper end of the enlargement of passageway 8.

Also during the filling operation the backflow check valve 33 remains open (being provided with ports 33a within the valve body 33b). Gravity and the weight of the movable poppet 34 in this valve keeps it open always unless the filling valve 31 itself fails to close after the filling is complete. In the event of such failure, and while the upper end of the filling passageway above the filling valve is open (through accident or design) there will be a sudden up-rush of gas from the tank seeking to escape from this open passageway on which external pressure has been relieved. Then it is that the backflow check valve 33 instantly closes and prevents the further escape of fuel.

Shutoff valve 35 is built into the fitting 2, which fully encases it and fully protects it from damage. By turning the handwheel 36, or other means supplied, valve stem 37 may be rotated to open the shutoff valve 35; and this shutoff valve is left wide open at all times during the normal operation of the control fitting, so that fuel (in liquid or gaseous form, as may be desired) may be delivered out of the storage tank through passageway 9, through cross channel 12, into recess channel 11 and outward through the gas delivery pipe 38 to the place where the fuel is consumed or further conditioned or otherwise used.

The construction in the control fitting of tubular adapter 39, removably carried in the recess 10 in the upper part of the fitting and arranged for connection with the gas delivery pipe 38, has a very distinct advantage: neither the pipe nor the adapter is connected directly to the shutoff valve. In practical operation this means that throughout long years of use the pipe connection and the adapter need never be disturbed. No need arises to unscrew or break these connections. Therefore a common source of leaks and danger is immediately eliminated.

On the other hand, this construction affording an offset outlet from the delivery passageway 9 allows parts of the shutoff valve 35 to be quickly inserted and made up in the fitting, and further allows them to be easily removed for cleaning and inspection whenever desired. These things can be done without in any way interfering with or disconnecting the gas delivery pipe 38.

Ordinarily, and in old style arrangements (and even in my co-pending application referred to above) the shutoff valve cannot be removed without disconnecting the gas delivery pipe; and also in the old style usage the valve ordinarily employed to shut off the flow of fuel is externally mounted, large and cumbersome, requiring a rather large radius for it to be screwed in and out. All of these objectionable features are eliminated in my present construction.

Whenever my present control fitting is used, and part of shutoff valve 35 is removed therefrom for any reason, the excess flow valve 40 carried below passageway 9 will immediately close and prevent the very undesirable discharge of inflammable and explosive fuel to the atmosphere. This excess flow check valve 40 is extremely simple in design, and it cannot get out of order. It has no spring; and its operation depends upon the weight and size of its movable thimble 41 and on the size and number of the ports in the thimble. These factors, once fixed, are ever present and unchanging.

This control fitting can be used as well for the delivery of liquid fuel from the tank and out through the shut-off valve 35 as for the delivery of gaseous fuel. Some operators use the liquefied petroleum fuel storage tank for the generation of gas, and when so used my fitting can be employed for the delivery of this gas.

On the other hand, liquid may be withdrawn from the storage tank to be made into gas in another place, or for other uses; and this fitting is adaptable to such operation. It is made so by attaching a pickup pipe 54 which may be screwed into the bottom of the excess flow check valve 40. This pickup pipe is arranged to extend almost to the bottom of the storage tank, so that it always picks up liquid fuel.

The relief valve 14 built into this control fitting is constructed with sufficient portion of the body of the fitting about it to house and protect it; yet the discharge opening from the top of the relief valve is so offset at the top of the fitting and near its periphery that a connection can easily be made for a discharge pipe to carry away the gas relieved when the valve operates; and such construction conduces to the reduced size and small compass of the body of the fitting.

The relief valve itself is here made smaller than conventional relief valves because of a novelty in design which provides apertures 42 at the base of the valve for receiving fluid from the tank discharged by excess pressure, and these apertures are placed at an angle in the cup-disc 43 so that this discharge is thrown upwardly toward the center of the discharge passageway 13 in the fitting. These apertures 42 are not opposed to one another, as in some old valve construction which decreases the flow and velocity through the apertures because of their opposed disposition. My present relief valve operates quickly and positively, and discharges through a free and open channel up through the center of the valve. Gas passes upward and outward through the area within the coil of the spring 44.

This arrangement obviates the usual and old construction which allows the spring to be an obstacle and a hindrance to the passage of gas. Usually the gas is discharged around the outside of the spring and must find its way through its coils. Such old construction made the body of the relief valve larger than necessary. In such construction when the coil spring is entirely compressed the flow of fluid discharged is almost stopped. In my arrangement even the complete compression of the coil offers no hindrance whatever to the escape of fluid.

The relief valve 14 has an adjusting disc 45 movably threaded into the upper interior wall of passageway 13; and the disc is provided with an opening 46 therethrough for the escape of fluid. It also has holes 45a therein for an adjusting wrench. This disc also forms a housing for the upper end of the spring 44. If the threads holding disc 45 become destroyed or damaged this disc may not be expelled through the upper part of passageway 13 because of the presence of a safety shoulder 13e at the top of this passageway which may be built in and made integral with the body of the fitting, or which may be made of a ring threaded into the top of passageway 13 to form the shoulder.

The bottom of the cup-disc 43 carries gasket 47 kept in place by screw 48 and washer 49. The lower end of the relief valve is finished by retaining plug 50 which is screwed into the bottom of passageway 13 and sealed in place by the use of gasket ring 51. There is an opening 53 through the plug; and the upper end of this plug is finished in a valve seat 52 which co-acts with gasket 47 to close the valve.

Any suitable liquid level gage that may be carried in a substantially vertical opening can be used in my control fitting; and although I have shown a slip tube gage of my own designing it is not to be thought that other and proper liquid level gages may not be used.

However the only suitable filling, shutoff and relief valves which can be operated as a part of the mechanism of my fitting are those constructed substantially in keeping with the disclosures hereinabove made wherein these valves are part and parcel of the fitting itself.

The offset connection features disposed at or within the top of the fitting are highly desirable and become an important part of this invention because such arrangement allows the compactness of an unusually small fitting.

An essential advantage of this invention is found in the design and construction creating a very small, lightweight and inexpensive control fitting comprising a compact and indestructible body which in itself forms a part of and entirely encases and protects suitable valve mechanism for controlling volatile liquefied petroleum gas. The essential operating and moving elements of such mechanism are wholly lodged within and encased by the fitting body which completely protects them from damage of external force accidentally applied.

To accomplish these valued purposes the lower part of the fitting is designed in that very minimum size requisite for accommodating the required openings in the bottom of the fitting. Then the top of the fitting is made wider to allow suitable arrangement for spreading further apart the connections which must be made to the top of the fitting (for the introduction, delivery and relief of the gas under pressure). If such arrangement were not made to spread the top outlets, they would be so crowded together as to be unusable and incapable of affording proper connections. On the other hand if the required wide spacing of the top outlets were allowed to control the lower diameter of the fitting by making all of the passageways vertical therethrough the resultant dispersing of the lower openings would serve no good purpose whatsoever and instead result in a great bulk and thickness of unnecessary material at the base of the fitting and almost double the weight and greatly increase the cost. These undesirable results have been eliminated by my design and construction.

The general appearance of this fitting is roughly that of an inverted frustrum of a cone, in which the narrow bottom affords full room for communication with the tank and the wider top affords ample room for required connections The smaller opening made in the tank not only results in lower costs of labor and material but allows the tank wall to remain strong, for the reason that large openings in a tank weaken the shell.

This inexpensive fitting therefore has a very long life, is leak-proof and damage-proof and greatly facilitates the safe handling of explosive gases, eliminating the always undesirable hazards constantly attending the use of control devices which are exposed and subject to the damages and leaks usually abounding in a great number of dangerously exposed threads, fittings and mechanisms ordinarily arrayed above the old style storage tanks.

I claim:

1. In apparatus for controlling liquefied petroleum gas, a control fitting arranged to be removably attached to a tank and provided with a compact body having therethrough a filling passageway and a delivery passageway; a filling valve so constructed within the filling passageway that the walls of the latter constitute a housing for the valve; a shutoff valve so constructed that the walls of the delivery passageway provide a housing for the valve and a shoulder within the passageway provides a valve seat, the valve being made to include the following members: a valve head arranged to cooperate with the valve seat, a valve plug having a recess arranged to receive the lower end of a valve stem, a valve stem provided at its lower end with an enlargement, a valve sleeve encasing the enlargement and providing within its upper part a shoulder arranged to articulate with the enlargement and confine it within the sleeve, the sleeve being removably connected to the valve head and so constructed as to allow limited movement of the enlargement within the sleeve, means for raising and lowering the valve head when the stem is rotated; and means for conducting fluid from the valve.

2. In apparatus for controlling liquefied petroleum gas, a control fitting arranged to be removably attached to a tank and provided with a compact body having therethrough a passageway; a shutoff valve so constructed that the walls of the passageway provide a housing for the valve and a shoulder within the passageway provides a valve seat, the valve being made to include the following members: a valve head arranged to cooperate with the valve seat, a valve plug having a recess arranged to receive the lower end of a valve stem, a valve stem provided at its lower end with an enlargement, a valve sleeve encasing the enlargement and providing within its upper part a shoulder arranged to articulate with the enlargement and confine it within the sleeve, the sleeve being removably connected to the valve head and so constructed as to allow limited movement of the enlargement within the sleeve, means for raising and lowering the valve head when the stem is rotated; a recess within the top of the fitting arranged for connection with a delivery pipe; and a transverse channel within the fitting body communicating with the passageway and with the recess and arranged to deliver fluid from the valve.

3. In apparatus for controlling liquefied petroleum gas, a control fitting arranged to be removably attached to a tank and provided with a compact body having therethrough a passageway; a shutoff valve so constructed that the walls of the passageway provide a housing for the valve and a shoulder within the passageway provides a valve seat, the valve being made to include the following members: a valve head arranged to cooperate with the valve seat, a valve plug having a recess arranged to receive the lower end of a valve stem, a valve stem provided at its lower end with an enlargement, a valve sleeve encasing the enlargement and providing within its upper part a shoulder arranged to articulate with the enlargement and confine it within the sleeve, the sleeve being removably connected to the valve head and so constructed as to allow limited movement of the enlargement within the sleeve, means for raising and lowering the valve head when the stem is rotated; a recess within the top of the fitting arranged for connection with a delivery pipe; a transverse channel within the fitting body communicating with the passageway and with the recess; an excess flow check valve carried within the passageway including: a shoulder within the passageway formed to provide a valve seat, an inverted thimble having an exterior surface arranged to articulate with the valve seat and so constructed and disposed within the passageway as to allow the escape of a normal amount of fluid when the shutoff valve is open, and being of such weight that it may be lifted up against the valve seat to close the valve whenever pressure above the valve is suddenly reduced.

4. In apparatus for controlling liquefied petroleum gas, a control fitting arranged to be removably attached to a tank and provided with a compact body which constitutes a valve housing; a relief valve arranged within a passageway disposed through the body, the passageway being provided with a safety shoulder in its upper part below which the valve is disposed, the valve including: retaining means within the lower end of the passageway formed to provide a valve seat; a movable cup-disc resting upon the retaining means and provided with apertures arranged at such angle as to allow fluid discharged therethrough to be directed upwardly toward the center of the passageway; a spring arranged to rest in the cup-disc; and movable spring adjusting means carried in the passageway.

5. In apparatus for controlling liquefied petroleum gas, a control fitting arranged to be removably attached to a tank and provided with a compact body which is constructed to house a valve; a shutoff valve carried within a passageway disposed through the body, the passageway having a shoulder therein to provide a valve seat; a valve stem; valve closing means loosely attached to the lower end of the valve stem and arranged to coact with the valve seat, said means having an annular projetcion on its upper face; a valve collar surrounding the valve stem and provided on its lower end with an annular recess arranged to receive the projection when the valve is fully opened; an adapter arranged to be connected with a gas delivery pipe; a recess within the top of the fitting arranged to carry the adapter; means to secure the adapter within the recess, a transverse channel within the fitting body communicating with the passageway and with the recess, to constitute an offset delivery channel connecting the shutoff valve with the adapter.

JOHN R. HOLICER.

REFERENCES CITED

The following references are of record in the file of this patent:

UNITED STATES PATENTS

| Number | Name | Date |
|---|---|---|
| 2,121,675 | White | June 21, 1938 |
| 2,176,829 | White | Oct. 17, 1939 |
| 2,293,356 | Parker | Aug. 18, 1942 |
| 2,303,712 | Sundstrom | Dec. 1, 1942 |
| 2,307,309 | Thomas | Jan. 5, 1943 |